Figure 1:
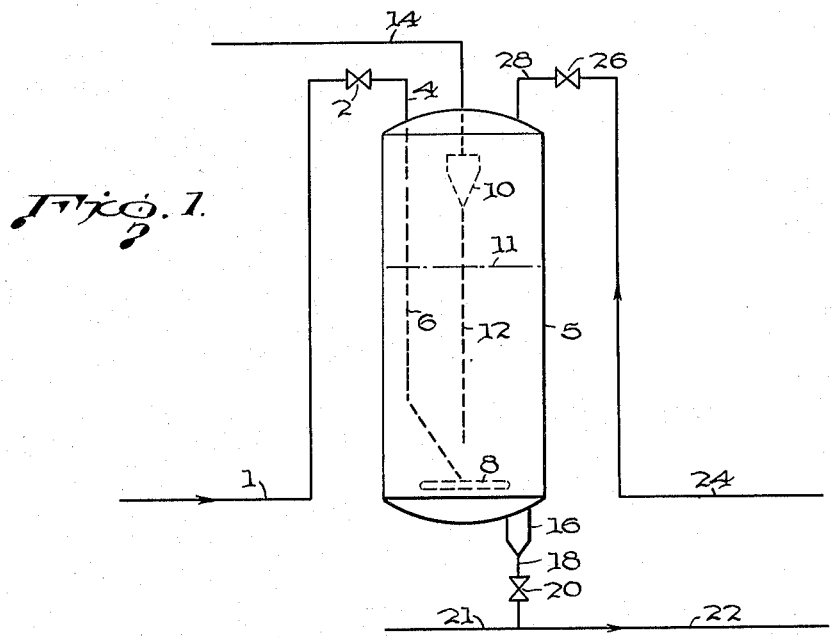

Dec. 29, 1953   P. W. CORNELL   2,664,338
LINE AND VALVE SYSTEM FOR FLUIDIZED PARTICLE HANDLING
Filed Aug. 25, 1950

INVENTOR.
PAUL W. CORNELL
BY
G. M. Houghton
his ATTORNEY

Patented Dec. 29, 1953

2,664,338

UNITED STATES PATENT OFFICE 2,664,338

LINE AND VALVE SYSTEM FOR FLUIDIZED PARTICLE HANDLING

Paul W. Cornell, Mount Lebanon, Pa., assignor to Gulf Oil Corporation, Pittsburgh, Pa., a corporation of Pennsylvania Application August 25, 1950, Serial No. 181,433

4 Claims. (Cl. 23—1)

1

This invention relates to an improved process and apparatus for the handling of finely divided particles in fluidized form.

In the handling of finely divided solid particles it has been found that a mass of such particles may be caused to behave as a liquid by passage therethrough of a gas or vapor. The gas or vapor is caused to pass through the body of particles at such a rate that the individual particles are held in a suspended, turbulent condition. As the fluidizing gas or vapor passes upwardly through the bed, the mass of particles takes on the appearance of a boiling liquid with the fluidizing gas or vapor leaving the bed at its surface.

As long as these particles are so suspended the mass of particles continues to act in many respects as a liquid, e. g., as to flow characteristics, the exertion of hydrostatic or "fluistatic" pressure, and the like.

One application of the above principles is made use of in the petroleum industry, where finely divided catalyst particles are caused to flow into and out of catalyst retaining vessels, e. g., reactors, regenerators, hoppers, storage vessels, coolers and the like, in which vessels the catalyst particles may be contacted with various gases or vapors.

In all instances it is conventional to introduce fluidizing gas or vapor into the particular vessel at or near the lower part of the bed. This is true, since a gas forced upwardly through a bed of particles tends to separate and suspend the individual particles, whereas a uniform gas pressure applied downwardly against a quiescent bed of particles tends to compact the bed or at least a portion thereof.

In the case of a catalytic reactor these fluidizing gases or vapors may comprise the reactants themselves, e. g., hydrocarbons or other substances to be converted, at least during the onstream or processing period. These reactants pass upwardly through the catalyst bed producing a suspension of particles and simultaneously come into intimate contact therewith. After passing through the catalyst bed the converted reactants are withdrawn from the reactor above the level of the catalyst bed.

In the case of a catalytic regenerator an oxidizing gas such as air, in intermixture with an inert gas, if desired, may be passed upwardly through the catalyst bed to oxidize or burn off contaminants and to perform the function of fluidizing the catalyst particles in this vessel.

In the case of a hopper, storage vessel, cooler or the like an inert gas such as steam or flue gas

2 may be passed upwardly through the catalyst bed in order to produce fluidization thereof. If desired, the inert gas may be employed to heat or cool the catalyst particles.

In all of the systems described above it is desired periodically to terminate the flow of material into the vessel. This is particularly true, for example, in the case of a fluidized fixed bed catalytic conversion system. A fluidized fixed bed system is distinguished from a fluidized moving bed system in that the operation of the former is cyclic, while that of the latter is continuous, and the catalyst bed of the former is substantially unreplenished and undiminished (except perhaps for make-up to replace fines lost in the process) throughout the processing period. At regular intervals flow of materials to the fluidized fixed bed reactor is interrupted, whereupon the catalyst may be regenerated in the same vessel or removed to a separate regenerator. Whether regeneration is effected in the reactor or in a different vessel, the regeneration is carried out with a fluidized fixed bed. In the latter method of regeneration, the entire catalyst content remains within the regenerator for a fixed period of time; at regular intervals flow of oxidizing gas through the catalyst bed is terminated, and catalyst is removed to the reactor.

In view of the cyclic nature of the fluidized fixed bed type of operation it will be seen that valves are required to close against a backflow of catalyst at regular and frequent intervals. For this reason the invention is particularly concerned therewith. While valves may be required to close against a backflow of catalyst in the fluidized moving bed type of operation, e. g., during shutdowns, these closures are relatively less frequent. The invention is, however, of value in connection with this type of operation.

As a matter of general practice the valves for terminating flow of materials into a fluidized catalyst bed are located beneath the bed, i. e., since the lines for introducing materials enter the bottom of the vessel the valve is located somewhere in this line and, therefore, beneath the level of the fluidized catalyst bed.

During closure of these valves, and as the flow of materials into the vessel is diminished, the hydrostatic or "fluistatic" pressure of the fluidized bed becomes greater than the line pressure, whereupon the suspended particles tend to flow backward in the line as would a liquid. Consequently, the valve must close against the backflow of particles. This results in abrasion of the valve faces and valve seats. Abrasion takes place to a considerable extent and is obviously undesirable because of damage to the expensive valve. Improper seating is one result following abrasion of the valve and seat. Improper seating is undesirable, since in many operations, leakage of pressure across the valve occurs. Valve closure against backflowing particles also results in crushing of the particles, which is to be avoided.

Where a vessel containing a fluidized particle bed is maintained at elevated pressure and is to be isolated from a lower pressure region, it is desirable to avoid leakage of pressure across the valves. An example of a system involving a pressure differential would be a fluidized fixed bed hydrogenation. In this instance, the hydrogenation is carried out at relatively high pressure, while regeneration is carried out at a substantially lower pressure. In view of the pressure differential and the incompatibility of the processing and regeneration cycles, the reactor must be isolated from the regenerator. Leakage of reactor pressure is to be avoided across any valve leading out of the reactor in order to avoid loss of product. Leakage across any valve between the reactor and regenerator, where these operations are carried out simultaneously and in separate vessels, as disclosed in my copending applications Ser. Nos. 181,431 and 181,432, filed August 25, 1950, in addition may be dangerous in view of the highly combustible nature of the reactants and the hydrogen.

It is an object of this invention to provide a process of the type described in which abrasion of the valve seats and valve faces is minimized. It is an additional object of this invention to avoid undesirable leakage of pressure across the valves employed in the system. An ancillary object of the invention is to provide a process for handling fluidized finely divided solid particles in which crushing of the particles during valve closure is substantially reduced. It is another object to provide suitable apparatus for performing the functions described above.

These and other objects are accomplished by my invention which relates to a process wherein materials are caused to flow into a bed of finely divided solid particles maintained in fluidized form and wherein this flow is periodically terminated. The improvement effected by the present invention comprises terminating the flow of materials mentioned at a point above the level of the fluidized bed. One modification of the invention additionally involves sweeping from the surfaces of the valve face or valve seat any solid particles which may have collected thereon. One further form of the invention involves a use of a vapor seal for preventing undesirable leakage of pressure. The invention also includes suitable apparatus for carrying out the above process.

Figures 2, 3:
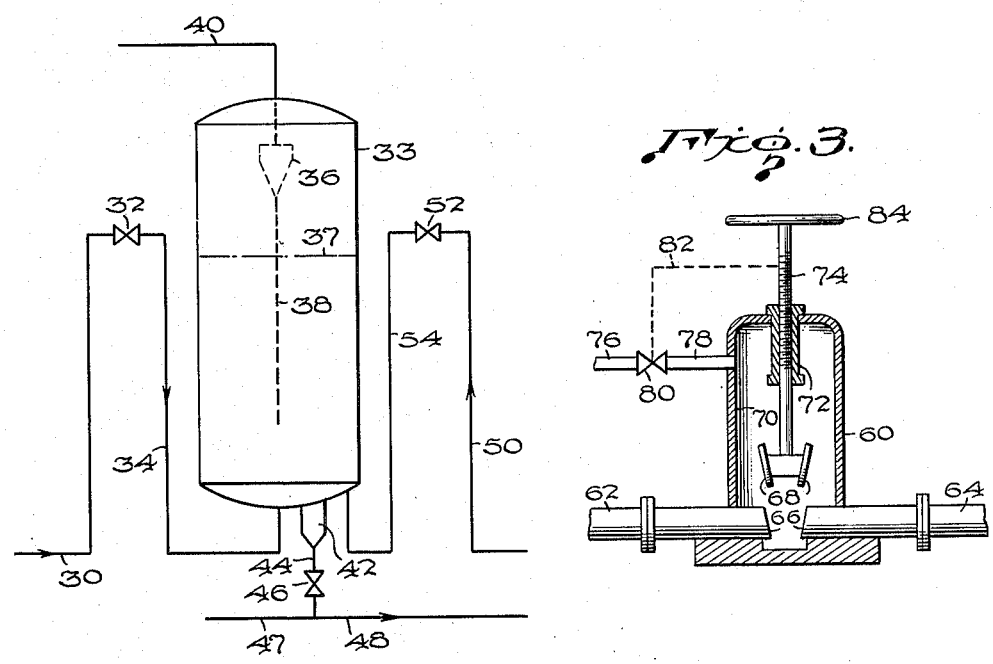

Figures 1 and 2 are diagrammatic illustrations of specific embodiments of my invention which illustrate two satisfactory line and valve arrangements in conjunction with vessels adapted to contain a fluidized bed of solid particles. Figure 3 is a diagram of a valve structure capable of performing the functions set forth herein.

In the accompanying description certain preferred modifications of the invention have been described. It is to be understood that these are by way of illustration only and not to be considered limiting.

Referring now in detail to Figure 1 fluidizing gas or vapor enters the system through line 1, valve 2, and line 4, from which they pass into vessel 5 by way of interior conduit line 6 through distributing means 8. Element 8 illustrates a suitable distributing means attached to the end of conduit line 6 in order to uniformly distribute the fluidizing vapors in the vessel. Any structure known for this purpose may be utilized. These vapors pass upwardly through the bed of finely divided particles and effect fluidization thereof. The vapors leave the vessel through cyclone separator 10 and pass out into line 14. A substantial portion of any particles carried along with the fluidizing vapor are separated therefrom in cyclone separator 10 and are returned through the main fluidized bed through standpipe 12. By vapor as used in the accompanying description is meant any substance which may exist in gaseous or vapor or mixed vapor-liquid form under the conditions employed.

When it is desired to empty the vessel, valve 20 is opened while passage of fluidizing vapors is continued through the bed of particles. Since the suspended particles, as indicated previously, act similarly as a liquid, they flow into collector 16, into line 18 through valve 20 and into line 22. A gaseous or vaporous conveying medium such as steam or flue gas may be introduced through line 21 to force the fluidized particles through line 22.

When it is desired to refill the vessel, valve 20 is closed and fluidized particles, conveyed by a gaseous medium, are introduced into line 24. From line 24 the suspended particles pass through valve 26 through line 28 and into vessel 5. Fluidization of the bed within the vessel may again be effected by introduction of fluidizing gases or vapors through line 1.

Considering the vessel illustrated as a catalytic reactor, operation would be as follows: reactants to be converted are introduced through line 1 through valve 2 into line 4 through interior conduit line 6 and into distributing means 8 from which they pass upwardly into the catalyst bed. The reactants are intimately contacted with catalyst particles during their passage through the bed. The converted reactants pass through the surface of the catalyst bed 11 and leave the reactor by way of cyclone separator 10 and line 14. Entrained catalyst particles are separated from the converted product in cyclone separator 10 and are returned to the main catalyst bed through standpipe 12.

When it is desired to terminate the processing period, as for example when the catalyst has been sufficiently deactivated as to require regeneration, valve 2 is closed. Since the catalyst bed resembles a liquid as to flow characteristics, it tends to seek its own level and flows backward through distributing means 8 and into line 6. The level of the catalyst in line 6 cannot come to rest substantially above the level in reactor 5. Because of the particular location of valve 2, it is not required to close against a backflow of catalyst.

If vessel 5 is considered as a catalytic reactor an additional line would be provided in order to maintain the catalyst bed in fluidized form after the flow of reactants therethrough has been terminated. This line could, for example, follow roughly parallel with lines 1, 4 and 6. Alternatively, this line (not shown) could enter line 4 and thus the fluidizing vapor would also pass through interior line 6 and distributing means 8. The fluidizing vapor passing through this line could be, for example, steam. The steam is useful not only for the purpose of maintaining the catalyst bed in fluidized form, but also for the purpose of sweeping out any traces of converted or unconverted reactants which remain in reactor 5 and the catalyst bed.

After the catalyst bed and reactor 5 have been purged sufficiently by the flow of steam therethrough, valve 20 is opened and steam or other gaseous conveying medium is introduced into line 21. The fluidized catalyst flows out of collector 16 into line 18 through valve 20 and into line 22 from which it may be conveyed to a regenerating vessel or waste, if desired.

When it is desired to place the reactor onstream again, valve 20 is closed and fresh or regenerated catalyst, along with a gaseous conveying medium such as steam or flue gas, is introduced into line 24 through valve 26, through line 28 and into reactor 5. When the catalyst level in reactor 5 has reached a satisfactory height, valve 26 is closed, valve 2 is opened and reactants are again introduced into the reactor.

The catalyst particles may be maintained in fluidized form within the reactor 5 during refilling, if desired, by passage of fluidizing gases or vapors through line 4 or through any auxiliary line (not shown).

Should vessel 5 be employed as a regenerating vessel, an oxidizing gas such as air or a mixture of air and an inert gas is passed through line 1, valve 2, lines 4 and 6, through distributing line 8 and into the catalyst bed. The oxidizing gas, initially heated to high temperature, causes combustion of the contaminants on the catalyst particles in addition to maintaining the bed in fluidized form. Once commenced, the combustion is exothermic and the oxidizing gases need not be preheated. Flue gas passes out of the regenerator through cyclone separator 10 and to line 14.

When the catalyst has been sufficiently regenerated valve 20 is opened and the particles flow from vessel 5 through collector 16, line 18 through valve 20 and into line 22. The particles are conveyed through line 22 to a reactor, for example, not shown, by means of a conveying gas such as steam, which has been introduced through line 21. A new supply of deactivated catalyst may be introduced into the regenerator after closing valve 20 and opening valve 26 through lines 24 and 28.

If the vessel 5 is considered as a cooler, storage vessel, hopper, or the like which may be, for example, located intermediate of the reactor and the regenerator, the vessel is filled by way of line 24. The catalyst content of the vessel is maintained in fluidized form by means of fluidizing gases or vapors introduced through line 1. If it is desired to further heat or cool the catalyst contained in vessel 5 the fluidizing gases or vapors may perform this function. Fluidizing gases or vapors pass out of the vessel as in the instance previously described. Emptying of the vessel is similarly accomplished.

Where regeneration is carried out within the same vessel, catalyst withdrawal lines, etc. are not necessary. Catalyst introduction means may be employed, however, in order to add make-up catalyst to replace that lost through the cyclone separator.

Referring now to Figure 2, a vessel similar to that shown in Figure 1 is illustrated but with a somewhat different arrangement of the introductory and withdrawal lines. In this modification the fluidizing vapors enter vessel 33 by way of line 30 valve 32 and line 34. These vapors pass upwardly through the catalyst bed and out of vessel 33 to cyclone separator 36 and line 40. Fluidized particles to be withdrawn from the vessel pass out of vessel 33 through collector 42, line 44, through valve 46 and into line 48. The particles are forced through line 48 by a gaseous conveying medium introduced through line 47. Particles are reintroduced into the vessel by way of line 50, through valve 52 and line 54.

The purpose of the modification shown in Figure 2 is to illustrate the fact that the invention is not governed by the point at which the lines enter the vessel. Whereas in the apparatus of Figure 1 the lines enter the vessel at the upper portion thereof, in the modification of Figure 2 the lines enter the vessel at the bottom. The feature common to both modifications is that the valves in these introductory lines are positioned above the level of the fluidized bed of particles in order that these valves will not have to close against the backflow of the fluidized bed.

While the functioning of the apparatus shown in Figure 2 has been described broadly, the system shown may operate for any of the purposes discussed in connection with the modifications illustrated in Figure 1. The lines and valves of Figure 2 in each case would function similarly as corresponding elements described in Figure 1.

In the operation of certain of the valves illustrated in Figures 1 and 2, particularly those through which particles are conveyed, it will be seen that a certain amount of these particles may come to rest on various operating surfaces of the valve. As has been discussed previously it is also desirable, in instances where applicable, to insure against leakage across the valve.

The meritorious performance of my line and valve system may, therefore, be enhanced considerably by the employment of a valve which will overcome the difficulties described immediately above. Such a valve is illustrated diagrammatically in Figure 3.

Referring to this figure in detail, numeral 60 refers to the entire valve assembly. Numerals 62 and 64 denote the lines through which flow is to be terminated or begun. Numeral 66 refers to the valve seats which are engaged by disc shaped valve members 68. Numeral 70 refers to a bonnet surrounding the valve structure and adapted to withstand the pressure necessary for the vapor sealing arrangement. Numeral 72 illustrates a shaft seal to prevent leakage of pressure in the bonnet 70 to the atmosphere. Numeral 74 refers to the valve stem which serves to engage or disengage valve seats 66 and valve member 68. Lines 76 and 78 serve to introduce the sweeping and sealing vapor which may be, for example, steam. Flow of the sweeping and sealing gas or vapor is controlled by valve 80 which is in turn actuated by a suitable connecting means 82. Connecting means 82 is in turn actuated by the position of valve stem 74.

Any suitable connecting means known to the art may be employed, for example, an electrical control means. Alternatively, a mechanical system may be used which may be actuated by a collar, for example, on valve stem 74.

In the operation of the valve fluidizing vapors or catalyst particles intermixed with a gaseous conveying medium are passed through lines 62 and 64. When it is desired to terminate the flow of materials through these lines, hand wheel 84 is rotated in such a manner as to lower valve members 68 toward valve seats 66. As valve members 68 approach valve seats 66, a means attached to valve stem 74 actuates connecting means 82 which in turn operates valve 80. A sweeping and sealing gas such as steam is thereupon admitted to the interior of bonnet 70 through lines 76 valve 80 and line 78. This gas cannot flow out of bonnet 70 because of shaft seal 72. Therefore, the gas travels downwardly from its place of entry into the bonnet and across the surfaces of valve members 68 and valve seat 66 and into lines 62 and 64, thus serving to sweep the engaging faces thereof of any solid particles which have collected thereon. As final closure is effected the flow of sealing vapors is continued into the bonnet 70 until a pressure greater than maximum line pressure is reached. Accordingly, any leakage across the valve during a subsequent processing step will be from the bonnet to the line rather than from line to the valve bonnet and thence into the other line.

As indicated, my invention is applicable to valves which normally would close against a backflow of particles. The fundamental condition to be observed with respect to the invention is that such valves are placed above the level of the fluidized bed at the time the valves are to be closed. By "fluidized bed level" is meant, of course, the level reached by the fluidized bed after the effect of backflow has been realized.

The precise level above which the valves must be placed varies according to the type of operation. At the beginning of a processing period, fluidization may be started prior to closure of the valve through which particles are introduced. In these instances, the level of the bed may correspond to the full expanded level, and the valve should be above the turbulent or dense phase level. On the other hand, where a mere transfer of particulate material is about to be completed, the valve need only be high enough to prevent backflow of particles through it. The level of the bed in this instance is usually somewhat less than the normal fluidized level, although it is not as low as the quiescent bed level, since the bed may require some time to deaerate completely.

The discussion above deals with the minimum height of the valves. The considerations involving the minimum level above which the valves must be placed, may, of course, be obviated by placing all valves concerned above the highest level to be reached by the fluidized bed.

While I have described my invention particularly in connection with catalytic conversions, it is by no means limited thereto. The invention is equally applicable to any and all systems which involve the handling of solid finely divided particles in fluidized form.

While certain apparatus has been illustrated in the drawings I do not intend to be limited to the details of structure specifically shown. For example, the invention is not limited to any particular place of entry for the various lines. The lines may enter the vessels at any particular point so long as the valve is positioned above the level of the fluidized particle bed, or at least the level attained by the particle bed after the full effect of backflow has been realized. Where it is necessary to introduce the materials at the bottom of the particle bed, as in the case of the fluidizing gas or vapor, an interior extension line will be provided, if necessary, to direct these gases from the place of entry to the lower part of the vessel.

Furthermore, I do not intend to be limited to the particular valve structure illustrated. The illustrated device is but one of several which could be employed to perform the same functions.

While I have suggested certain specific lines in which valves may advantageously be positioned in accordance with the invention, and while certain specific valves have been mentioned as preferably replaced by the sweeping and sealing valve, the invention is not limited thereto. Other lines to which the invention is applicable and which could be improved thereby, will occur immediately to those skilled in the art.

One principal advantage produced by my invention is that abrasion of the valve seat and valve face has been substantially reduced. I have also provided a process and apparatus which will accomplish the above advantages and in addition prevent undesirable leakage across the valve. One further advantage of my invention is that these previously named advantages are accomplished without any substantial increase in the cost of apparatus.

What I claim is:

1. An apparatus for handling a bed of fluidized finely divided solid particles comprising a vessel for retaining a bed of finely divided solid particles in fluidized form, conduit means for introducing material into said vessel, a single valve means in association with said conduit controlling all flow through the conduit, said valve means being positioned above the level of the fluidized bed of particles and comprising a valve seat, a valve member adapted to engage said valve seat, a bonnet housing said single valve means, and operating means for engaging and disengaging said valve member and said valve seat, a vapor supply conduit communicating with said bonnet, an auxiliary valve means in association with said vapor supply conduit, connecting means actuated by said operating means and actuating in turn said auxiliary valve means, said auxiliary valve means being adapted to open during closure of said single valve means.

2. An apparatus for handling a bed of fluidized finely divided solid particles, comprising a vessel adapted to retain a bed of finely divided solid particles in fluidized form, conduit means for introducing material into said vessel, valve means in association with said conduit, said valve means being adapted to control flow of material through said conduit, said valve means being positioned above the level of the fluidized bed of particles and comprising a valve seat, a valve member adapted to engage said valve seat, a valve bonnet adapted to house said valve means, operating means for engaging and disengaging said valve member and said valve seat, a vapor supply conduit communicating with said valve bonnet, an auxiliary valve means in association with said vapor supply conduit, connecting means actuated by said operating means and adapted to actuate in turn said auxiliary valve means, said auxiliary valve means being adapted to open during closure of said primary valve means.

3. In a process wherein materials are caused to flow from a conduit which discharges into the lower portion of a fluidized bed of finely divided solid particles, wherein said flow is periodically terminated by blocking off said conduit and wherein the pressure exerted by the bed of particles at the discharge end of the conduit exceeds the conduit pressure during termination of flow to the extent that a portion of said bed of particles is forced into said conduit, the improvement which comprises terminating said flow by blocking off said conduit at a place above the level of the fluidized bed of particles, and during the blocking off of said conduit, directing a flow of sweeping vapor from a source external to the conduit over the place at which the conduit is being blocked off to entrain quiescent particles therein, and directing said sweeping vapor and entrained particles into the conduit, and after said conduit is completely blocked off, continuing to introduce said vapor into the region adjacent said place until the gas pressure in this zone is above the maximum pressure to be reached in the conduit.

4. In a process wherein finely divided solid particles are caused to flow, from a source external to and at a lower level than a fluidized bed of finely divided solid particles, through a conduit which discharges into the lower portion of said fluidized bed of finely divided solid particles, wherein said flow through the conduit is periodically terminated by blocking off said conduit and wherein the pressure exerted by the fluidized bed of particles at the discharge end of the conduit exceeds the conduit pressure during termination of flow to the extent that a portion of said bed of particles is forced into said conduit, the improvement which comprises causing the finely divided solid particles to flow through a conduit from said external, lower level source, upwardly to a point above the level of the fluidized bed of finely divided solid particles and thence downwardly into the fluidized bed of finely divided solid particles and terminating said flow by blocking off said conduit at said point above the level of the fluidized bed.

PAUL W. CORNELL.

References Cited in the file of this patent

UNITED STATES PATENTS

| Number | Name | Date |
| --- | --- | --- |
| 1,984,380 | Odell | Dec. 18, 1934 |
| 2,385,446 | Jewell et al. | Sept. 25, 1945 |
| 2,392,765 | Reeves | Jan. 8, 1946 |
| 2,431,630 | Arveson | Nov. 25, 1947 |
| 2,433,798 | Voorhees | Dec. 30, 1947 |
| 2,440,482 | Martin | Apr. 27, 1948 |
| 2,449,615 | Peck | Sept. 21, 1948 |
| 2,459,824 | Leffer | Jan. 25, 1949 |
| 2,516,190 | Dougherty et al. | July 25, 1950 |
| 2,560,403 | Arveson | July 10, 1951 |
| 2,584,083 | Mellett | Jan. 29, 1952 |
| 2,589,862 | Putney | Mar. 18, 1952 |

FOREIGN PATENTS

| Number | Country | Date |
| --- | --- | --- |
| 487,886 | Germany | Dec. 17, 1929 |